US011243955B2

(12) United States Patent
Ackermann et al.

(10) Patent No.: US 11,243,955 B2
(45) Date of Patent: Feb. 8, 2022

(54) LATENT TOKEN REPRESENTATIONS FOR PASSAGE AND ANSWER SCORING IN QUESTION ANSWERING SYSTEMS

(71) Applicant: INTERNATIONAL BUSINESS MACHINES CORPORATION, Armonk, NY (US)

(72) Inventors: Christopher F. Ackermann, Fairfax, VA (US); Charles E. Beller, Baltimore, MD (US); Stephen A. Boxwell, Columbus, OH (US); Edward G. Katz, Washington, DC (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 15/825,824

(22) Filed: Nov. 29, 2017

(65) Prior Publication Data

US 2019/0163789 A1 May 30, 2019

(51) Int. Cl.
*G06F 16/30* (2019.01)
*G06F 16/2455* (2019.01)
(Continued)

(52) U.S. Cl.
CPC ...... *G06F 16/24564* (2019.01); *G06F 16/243* (2019.01); *G06F 16/3329* (2019.01); *G06F 16/93* (2019.01)

(58) Field of Classification Search
CPC .. G06F 16/24564; G06F 16/243; G06F 16/93; G06F 16/3329; G06F 16/248;
(Continued)

(56) References Cited

U.S. PATENT DOCUMENTS

2015/0074112 A1 3/2015 Liu et al.
2015/0235131 A1 8/2015 Allen et al.
(Continued)

FOREIGN PATENT DOCUMENTS

CN 102436510 A 5/2012
CN 102956126 A 3/2013

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Sana A Al-Hashemi
(74) *Attorney, Agent, or Firm* — Dmitry Paskalov

(57) ABSTRACT

The present invention may receive the question, a plurality of the candidate answers, and a plurality of documents associated with the plurality of candidate answers in the natural language. Then the present invention may tokenize the question, the plurality of the candidate answers, and the plurality of the documents into a corresponding n-gram sequence. The present invention may map n-gram elements from the tokenized question to the n-gram elements of the plurality of the tokenized candidate answers and the plurality of the tokenized documents using the latent token representation technique. The present invention may score the plurality of tokenized candidate answers based on the latent token representation technique. Then, the present invention may determine the precise answer based on the plurality of scored candidate answers.

20 Claims, 5 Drawing Sheets

(51) Int. Cl.
*G06F 16/93* (2019.01)
*G06F 16/242* (2019.01)
*G06F 16/332* (2019.01)

(58) Field of Classification Search
CPC .......... G06F 16/3344; G06F 16/24578; G06F 16/285; G06F 16/3347
USPC ........ 707/609, 698, 705, 769, 790, 813, 821
See application file for complete search history.

(56) References Cited

U.S. PATENT DOCUMENTS

| | | | |
|---|---|---|---|
| 2016/0104075 A1 | 4/2016 | Chowdhury et al. | |
| 2016/0179811 A1 | 6/2016 | Allen et al. | |
| 2016/0300154 A1 | 10/2016 | Bufe et al. | |
| 2017/0351677 A1* | 12/2017 | Chaubal | G06F 16/24578 |
| 2019/0163789 A1* | 5/2019 | Ackermann | G06F 16/24564 |
| 2020/0311739 A1* | 10/2020 | Chopra | G06F 16/353 |
| 2021/0294828 A1* | 9/2021 | Tomkins | G06F 16/3347 |
| 2021/0294970 A1* | 9/2021 | Bender | G06F 40/289 |
| 2021/0295822 A1* | 9/2021 | Tomkins | G06F 40/20 |

OTHER PUBLICATIONS

Yen et al., "A support vector machine-based context-ranking model for question answering", Information Sciences: an International Journal archive, vol. 224, Mar. 2013, pp. 77-87, Elsevier Science Inc., New York, NY, USA.

Anonymous, "Projection based scoring of candidate answers in a question answering system", An IP.com Prior Art Database Technical Disclosure, IP.com No. IPCOM000239281D, IP.com Electronic Publication Date: Oct. 27, 2014, pp. 1-4.

* cited by examiner

US 11,243,955 B2

LATENT TOKEN REPRESENTATIONS FOR PASSAGE AND ANSWER SCORING IN QUESTION ANSWERING SYSTEMS

STATEMENT REGARDING FEDERALLY SPONSORED RESEARCH OR DEVELOPMENT

This invention was made with Government support. The Government has certain rights in this invention.

BACKGROUND

The present invention relates, generally, to the field of computing, and more particularly to question answering (QA) in a natural language.

QA may be a computer system that combines information retrieval and natural language processing (NLP) capabilities and enables the location of answers to a specific question from an unstructured collection of natural language documents. Typically, a QA system extracts pertinent information from the question and generates a set of candidate answers while each set has a confidence score. QA may determine the best answer using a correlation between the confidence score and the candidate answer. For example, answers with high associated confidence scores may be rated a better quality.

SUMMARY

According to one embodiment, a method, computer system, and computer program product for determining a precise answer to a question using a latent token representation technique is provided. The present invention may receive the question, a plurality of the candidate answers, and a plurality of documents associated with the plurality of candidate answers in the natural language. Then the present invention may tokenize the question, the plurality of the candidate answers, and the plurality of the documents into a corresponding n-gram sequence. The present invention may map n-gram elements from the tokenized question to the n-gram elements of the plurality of the tokenized candidate answers and the plurality of the tokenized documents using the latent token representation technique. The present invention may score the plurality of tokenized candidate answers based on the latent token representation technique. Then, the present invention may determine the precise answer based on the plurality of scored candidate answers.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
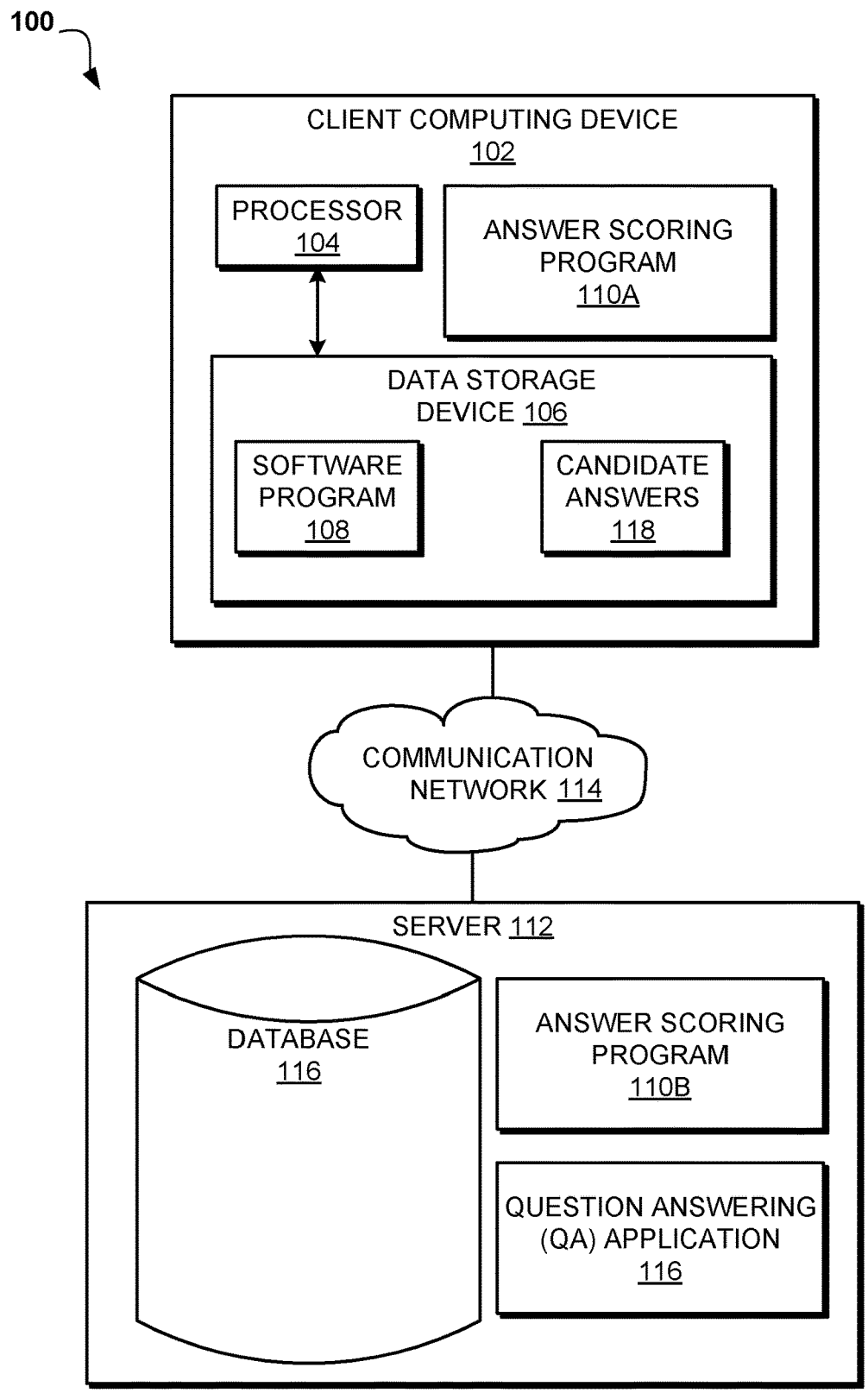
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to question answering (QA) in a natural language. The following described exemplary embodiments provide a system, method, and program product to, among other things, improve question answering quality by receiving a question and corresponding candidate answers within underlying documents that support the candidate answers, and, by using latent token representations, score the answers to determine the precise answer based on the determined confidence score. Therefore, the present embodiment has the capacity to improve the technical field of NLP by using a scoring method based on latent token representation of the underlying passage that supports the candidate answer. By using the scoring method based on Latent Token Representation of the underlying passage, the QA system may provide precise answers to questions where important information is missing either in a question or in an answer and otherwise would have not been chosen as a precise answer.

As previously described, QA may be a computer system that combines information retrieval and natural language processing (NLP) capabilities and enables the location of answers to a specific question from an unstructured collection of natural language documents. Typically, QA system extracts pertinent information from the question and generates a set of candidate answers while each set has a confidence score. QA may determine the best answer using a correlation between the confidence score and the candidate answer. For example, answers with high associated confidence scores may be rated a better quality.

IBM Watson® (IBM Watson and all IBM Watson-based trademarks and logos are trademarks or registered trademarks of International Business Machines Corporation and/or its affiliates) may be utilized as a QA system. IBM Watson® is a knowledge base service designed for question answering that may have the capabilities to apply advanced natural language processing, information retrieval, knowledge representation, automated reasoning, and machine learning technologies to the field of open domain question answering. Typically, the precise answer to a question is based on different techniques that are used to analyze natural language, identify sources, find and generate candidate answers, find and score evidence, merge and determine a confident score for the candidate answers, and pick the candidate answer with a highest confidence score as the precise answer.

In QA systems, the title, passage, or metadata of the document used to determine a candidate answer may contain a critical piece of information that may affect the confidence score. For example, in the question "Who is the Secretary General of NATO?", a document entitled "NATO" may be located with a passage that reads "The current Secretary General is Jens Stoltenberg". Unfortunately, this passage does not contain the word "NATO", which may cause the passage to be scored unreasonably low and, therefore, not chosen by a QA system as a precise answer. As such, it may be advantageous to, among other things, implement a system that receives a question coupled with candidate answers related to the documents or passages, determine a confidence score of each candidate answer using latent token representations, and choose the precise answer based on a confidence score.

According to one embodiment, an answer scoring program may receive a question and candidate answers coupled with the documents where the candidate answers may be derived from the documents or passages within the documents, and, using latent token representations, determine the confidence score of each candidate answer by analyzing metadata of the documents. A precise answer may then be chosen based on a highest confidence score.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to receive a question and candidate answers coupled with the documents from a QA application, and, using a latent token representation method, the embodiment may determine the confidence score of each candidate answer by analyzing metadata and the content of the documents to choose the precise answer based on a highest confidence score.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108, an answer scoring program 110A, a candidate answers 118, and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. Candidate answers 118 may be a data output received from QA application 116 in response to a question. According to at least one embodiment, the candidate answers 118 may include a question, candidate answers to a question, and documents corresponding to the candidate answers. The documents may be a text, a title, a passage or metadata associated with the candidate answer. In another embodiment, candidate answers 118 may be stored in database 116. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a question answering application 116, an answer scoring program 110B, and a database 116 and communicating with the client computing device 102 via the communication network 114, in accordance with embodiments of the invention. Question answering application 116 may be a program that enables identifying candidate answers to a specific question from an unstructured collection of natural language documents, such as IBM Watson® and storing the data in candidate answers 118. In another embodiment, the answer scoring program 110B may be integrated into the question answering application 116. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the answer scoring program 110A, 110B may be a program capable of determining a precise answer by analyzing the corresponding to the candidate answer documents determined by the QA application 116. The answer scoring method is explained in further detail below with respect to FIG. 2.

Figure 2:
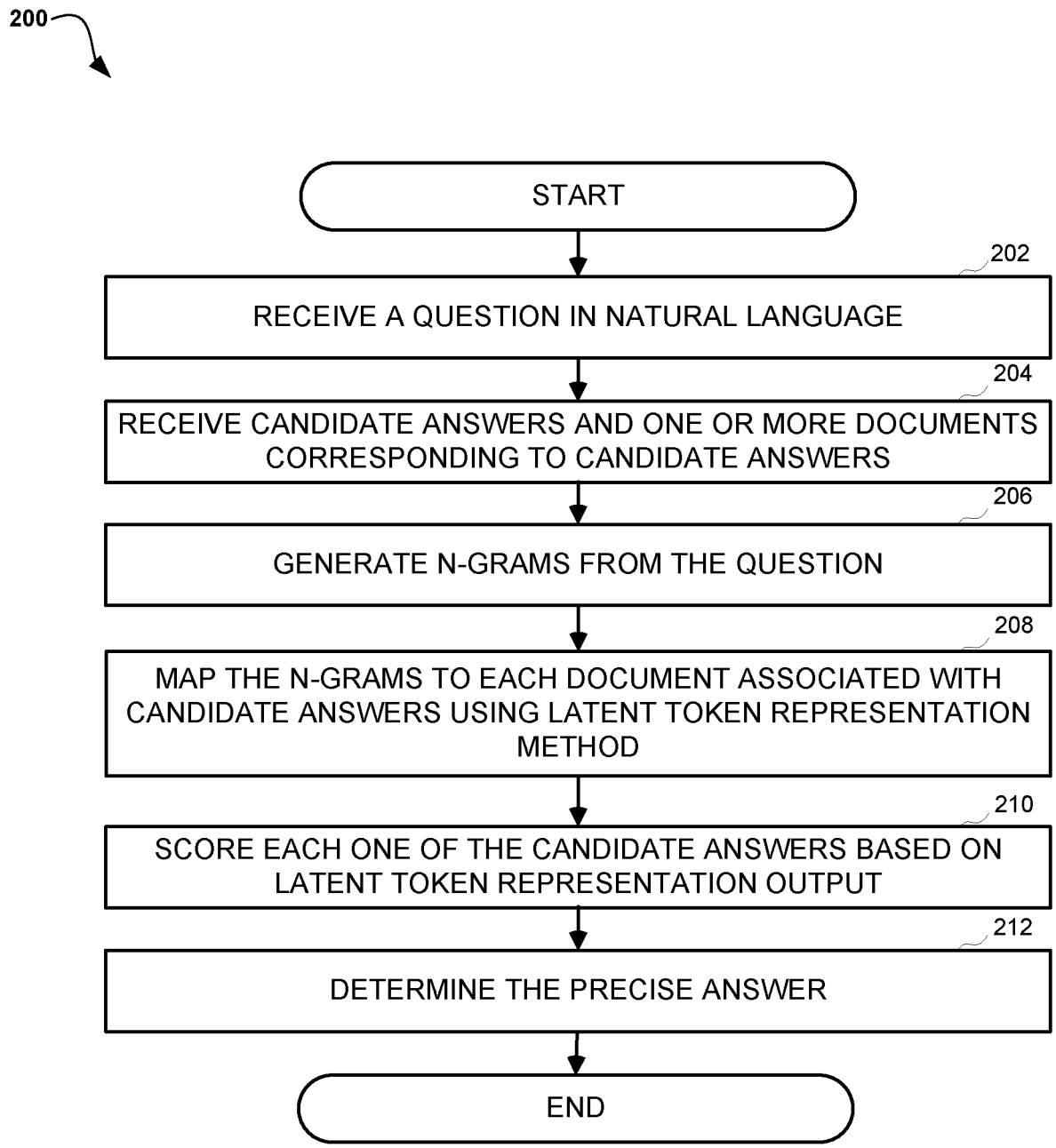
FIG. 2 is an operational flowchart illustrating an answer scoring process according to at least one embodiment.

Referring now to FIG. 2, an operational flowchart illustrating an answer scoring process 200 is depicted according to at least one embodiment. At 202, the answer scoring program 110A, 110B receives a question in a natural language. According to at least one embodiment, the answer scoring program 110A, 110B may receive the question as a text string from QA application 116. In another embodiment, the answer scoring program 110A, 110B may access the candidate answers 118 and load the question, or may ask a user of the client computing device 102.

Next, at 204, answer scoring program 110A, 110B receives candidate answers and one or more documents corresponding to candidate answers. According to at least one embodiment, answer scoring program 110A, 110B may receive the one or more documents from QA application 116 and extract a metadata, or a passage that corresponds to the candidate answer. In another embodiment, answer scoring program 110A, 110B may submit the question to the QA application and receive the candidate answers and the corresponding documents from the QA application 116. In further embodiment, the answer scoring program 110A, 110B may access the candidate answers 118 and load the documents. According to at least one embodiment, the one or more documents may be text files in a natural language or one or more passages corresponding to each of the candidate answers determined by the QA application 116 while analyzing the question.

Then, at 206, answer scoring program 110A, 110B generates n-grams from the question. According to at least one embodiment, answer scoring program 110A, 110B may generate a gappy n-grams from the question. Typically, n-gram is a sequence of adjacent elements or tokens from a string that may be a word, a letter, or a symbol. Gappy bigrams, or skipping bigrams, are word pairs which allow gaps between the n-gram elements. For example, if answer scoring program 110A, 110B tokenizes a question "Who is a secretary general of NATO?" using a gappy bigram, answer scoring program 110A, 110B may in addition to tokens "Who is", "is a", "a secretary", "secretary general", "general of", and "of NATO?" add tokens with a gap between the elements such as "who, secretary", "secretary, NATO?", etc.

Next, at 208, answer scoring program 110A, 110B maps the n-grams to each document associated with candidate answers using latent token representation method. According to at least one embodiment, answer scoring program 110A, 110B may tokenize the document data using the same n-gram technique as the tokenization of the question (such as using a bigram tokenization), and count the successful mappings of the question n-grams to the document data, and the number of skipped tokens according to the following latent token representation method:

1. Let L represent a set of latent tokens;
2. Let P represent the document in which the candidate answer appears;
3. Let variable R=0;
4. For each n-gram N in the question Q:
   a. Let F=false;
   b. Let S=0;
   c. Represent N as a queue NQ;
   d. Represent P as a queue PQ;
   e. While PQ is not empty:
      i. Let T be the first element of PQ;
      ii. Let M be the first element of NQ;
      iii. If M is equivalent to T:
         1. Dequeue the first token from NQ;
         2. Dequeue the first token from PQ;
         3. Set variable F=true;
      iv. Else if M is a member of L:
         1. Dequeue the first token from NQ;
         2. Set variable F=true;
      v. Else if F==true:
         1. Add a penalty to S corresponding to T;
         2. Dequeue the first token from PQ;
      vi. If NQ is empty
         1. Break;
   f. While NQ is not empty AND the first element of NQ is a member of L:
      i. Dequeue the first token from NQ;
   g. If NQ is empty:
      i. Add to R a weight representing S and the length of N;
5. Return R.

For example, in the question "Who is the secretary general of NATO?", the candidate answer is "Jens Stoltenberg is the current secretary general", and the title of the corresponding document is "Leadership of NATO". Without analyzing the document, the phrase "of NATO" is not appearing in the candidate answer, therefore this candidate answer would be assigned a low confidence score. In addition, if there is an additional candidate answer, such as "Ban Ki-Moon is the current secretary general", this candidate answer would be assigned the same confidence score, which may lead to returning an incorrect precise answer.

To continue the previous example, the latent token representation method may map the tokenized question Q=["secretary, general, of, nato"] to the passage P—"Jens Stoltenberg is the secretary general who is currently serving" from the document having a tokenized title L=["leadership, of, nato"] as described in the following iterations:

1. Token T is "Jens Stoltenberg". It is not equivalent to the first token of NQ ("secretary"). The method is not dequeening the element from the queue yet (that is, F==false), therefore, the method does not add a penalty. The queue is not empty, so the method proceeds to the next iteration.
2. Token T is "is". It is not equivalent to the first token of NQ ("secretary"). The method is not dequeening an element from the queue yet (that is, F==false), therefore, the method does not add a penalty. The queue is not empty, so the method proceeds to the next iteration.
3. Token T is "secretary". It is equivalent to the first token of NQ ("secretary"), so the method dequeening the first element from the NQ and PQ and sets F=true. The queue is not empty, so the method proceeds to the next iteration.
4. Token T is "general". It is equivalent to the first token of NQ ("of"), so the method dequeening the first element from the NQ and PQ and sets F=true (although it is already true). The queue is not empty, so the method proceeds to the next iteration.
5. Token T is "who". It is not equivalent to the first token of NQ ("of"), but it is a member of L, the set of latent tokens, therefore the method dequeening the first element from NQ and sets F=true (although it is already true). The queue is not empty, so the method proceeds to the next iteration.
6. Token T is still "who". It is not equivalent to the first token of NQ ("nato"), but it is a member of L, our set of latent tokens, so the method dequeening the first element from NQ and sets F=true (although it is already true). The queue is now empty, so we break and return R (that represents a perfect match).

Then, at 210, the answer scoring program 110A, 110B scores each candidate answer based on latent token representation output. According to at least one embodiment, answer scoring program 110A, 110B may score each candidate answer based on values returned by the latent token representation method performed in step 208, such as R, S, T and F. For example, the score may be a numerical value such as a weighted average of the values R, S, T and F. In another embodiment, answer scoring program 110A, 110B may use a simple Jaccard-style n-gram scorer that compares strings or sets of n-grams.

Next, at 212, the answer scoring program 110A, 110B determines the precise answer. According to at least one embodiment, the answer scoring program 110A, 110B may determine the precise answer based on the highest score of each candidate answer by picking the highest score candidate answer as the precise answer. In another embodiment, answer scoring program 110A, 110B may choose the candidate answer as a precise answer based on finding a perfect match only. In further embodiment, the answer scoring program 110A, 110B may prompt a user to select a high scoring answer from a list if there are a number of answers with scores above a predefined threshold value.

It may be appreciated that FIG. 2 provides only an illustration of one implementation and does not imply any limitations with regard to how different embodiments may be implemented. Many modifications to the depicted environments may be made based on design and implementation requirements.

Figure 3:
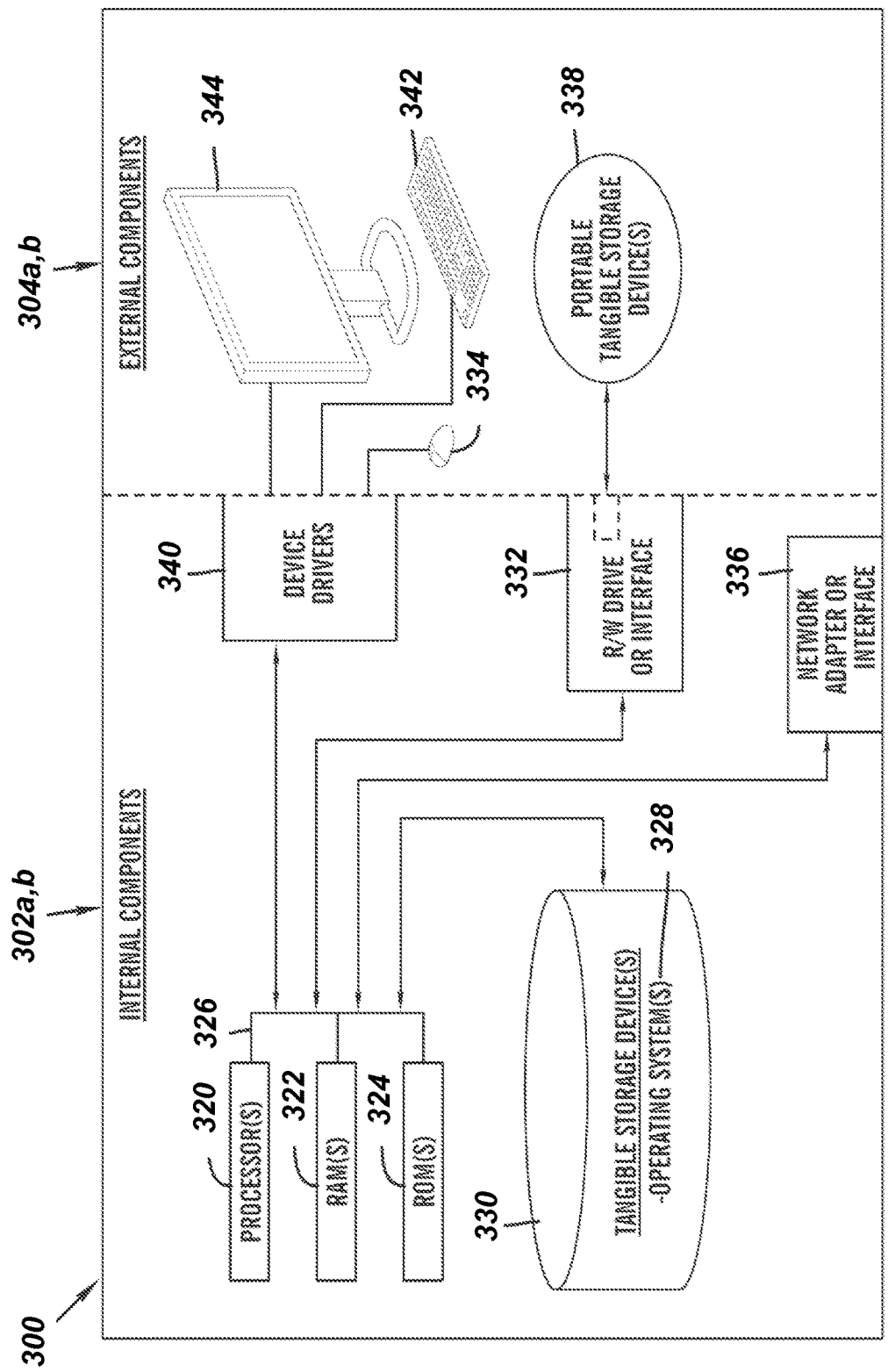
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the answer scoring program 110A in the client computing device 102, and the answer scoring program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the answer scoring program 110A in the client computing device 102 and the answer scoring program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the answer scoring program 110A in the client computing device 102 and the answer scoring program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
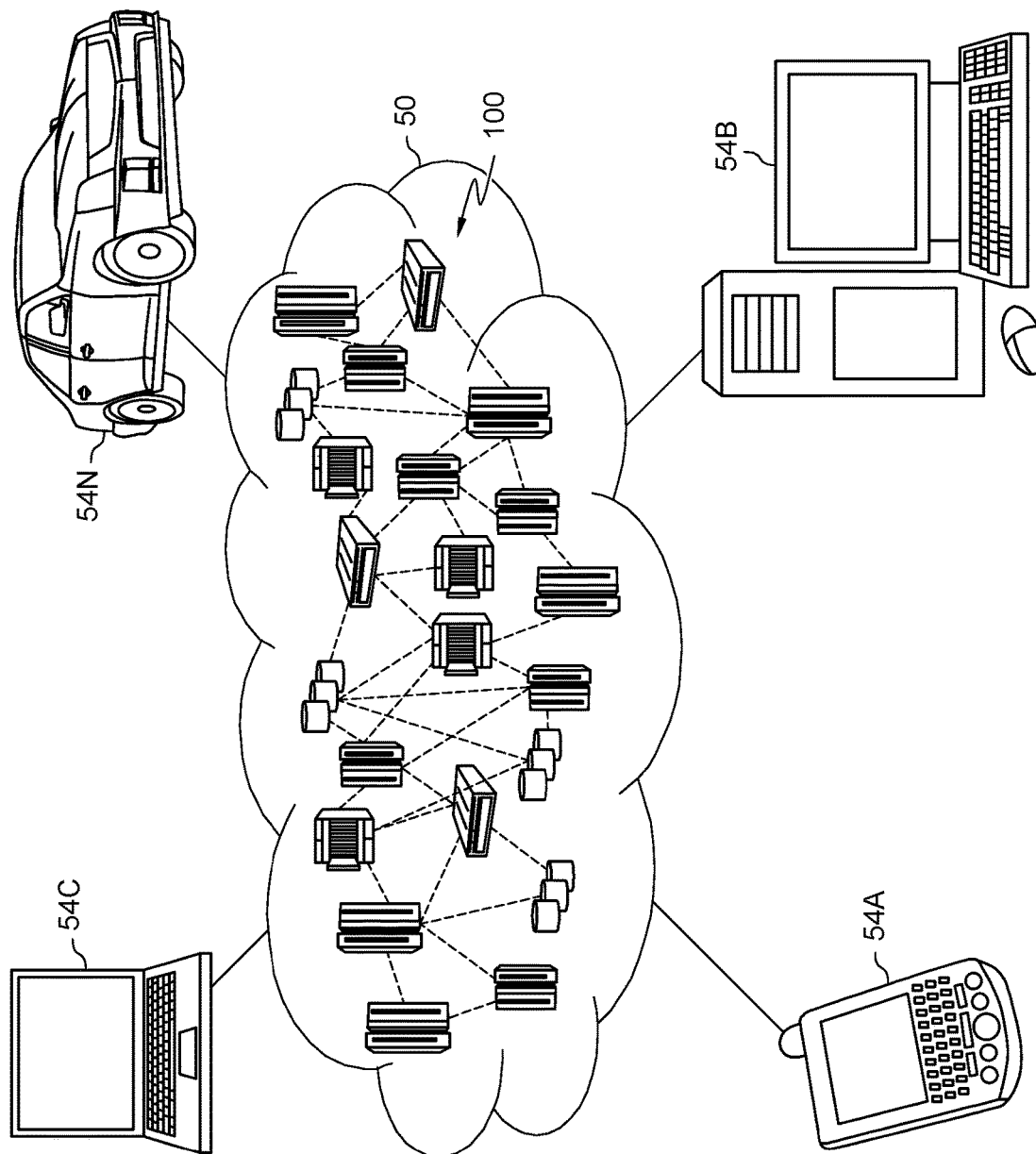
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
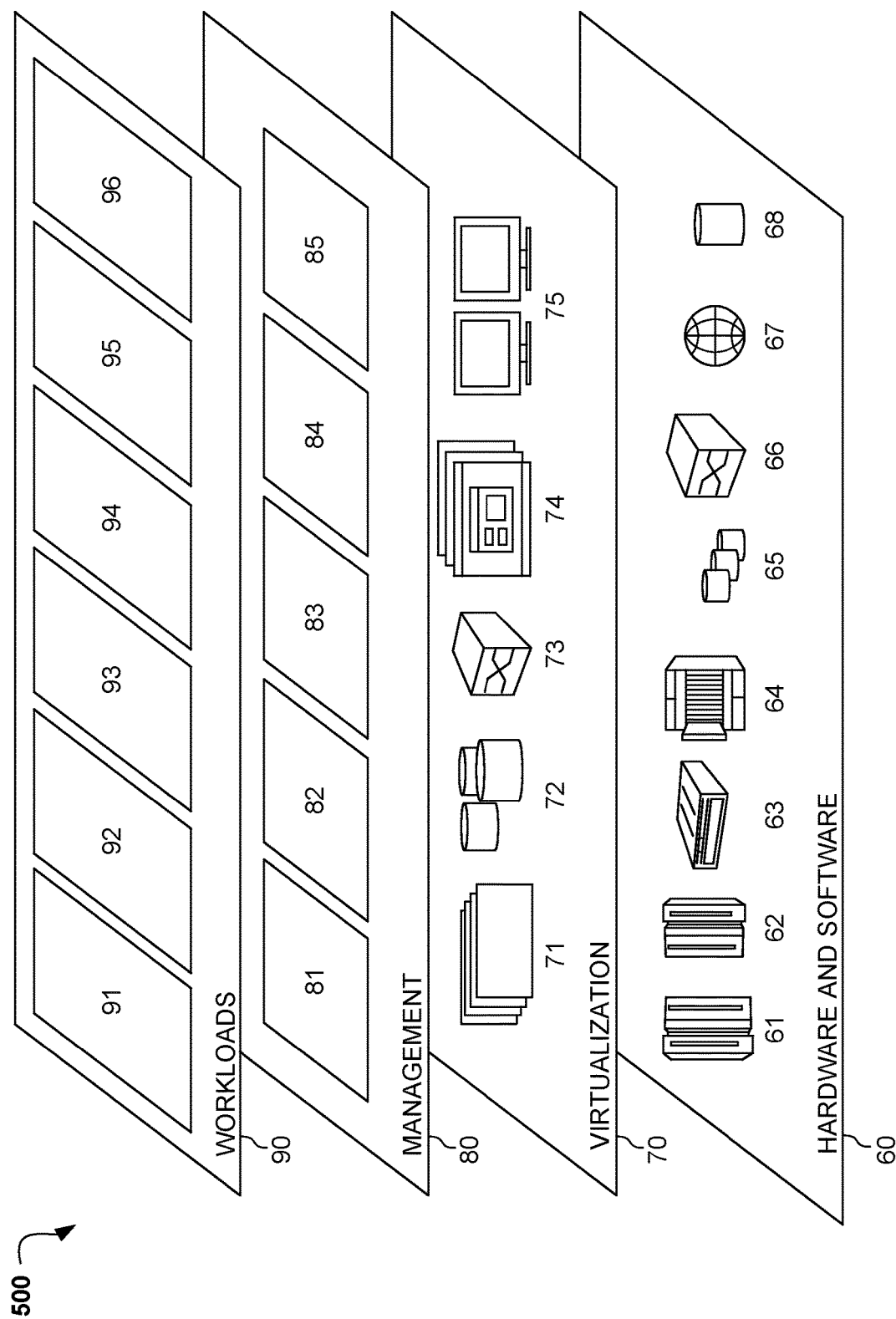
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and candidate answer scoring 96. Candidate answer scoring 96 may relate to analyzing the documents corresponding to candidate answers using a latent token representation method, and determining the precise answer based on a score derived from the latent token representation method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for determining a precise answer to a question using a latent token representation technique, the method comprising:
   receiving the question in a natural language;
   receiving a plurality of candidate answers and a plurality of documents associated with the plurality of candidate answers in the natural language;
   tokenizing the question, the plurality of the candidate answers, and the plurality of the documents into a corresponding n-gram sequence;
   mapping n-gram elements from the tokenized question to the n-gram elements of the plurality of the tokenized candidate answers and the plurality of the tokenized documents using the latent token representation technique;

scoring the plurality of tokenized candidate answers based on the latent token representation technique; and determining the precise answer based on the plurality of scored candidate answers.

2. The method of claim 1, wherein scoring the plurality of candidate answers is based on a simple Jaccard-style n-gram scorer, wherein the simple Jaccard-style n-gram scorer analyzes the mapped n-gram elements.

3. The method of claim 1, wherein each document within the plurality of documents is selected from a group consisting of a text, a title, a passage, and a plurality of metadata.

4. The method of claim 1, wherein the latent token representation technique comprises:

counting a number of successful mappings of the n-gram elements from the tokenized question to the n-gram elements of each document in the plurality of the tokenized documents and a corresponding tokenized candidate answer; and counting a number of skipped n-gram elements from the tokenized question to the n-gram elements of each document within the plurality of the tokenized documents and the corresponding tokenized candidate answer.

5. The method of claim 4, further comprising determining a return value based on a penalty value, wherein the penalty value is determined using the number of skipped n-gram tokens and the number of successful mappings.

6. The method of claim 5, wherein scoring the plurality of the candidate answers based on the latent token representation technique is determined from the return value.

7. The method of claim 6, wherein determining the precise answer comprises selecting the precise answer from the plurality of the candidate answers based on the return value associated with each candidate answer.

8. A computer system for determining a precise answer to a question using a latent token representation technique, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving the question in a natural language;

receiving a plurality of candidate answers and a plurality of documents associated with the plurality of candidate answers in the natural language;

tokenizing the question, the plurality of the candidate answers, and the plurality of the documents into a corresponding n-gram sequence;

mapping n-gram elements from the tokenized question to the n-gram elements of the plurality of the tokenized candidate answers and the plurality of the tokenized documents using the latent token representation technique;

scoring the plurality of tokenized candidate answers based on the latent token representation technique; and determining the precise answer based on the plurality of scored candidate answers.

9. The computer system of claim 8, wherein scoring the plurality of candidate answers is based on a simple Jaccard-style n-gram scorer, wherein the simple Jaccard-style n-gram scorer analyzes the mapped n-gram elements.

10. The computer system of claim 8, wherein each document within the plurality of documents is selected from a group consisting of a text, a title, a passage, and a plurality of metadata.

11. The computer system of claim 8, wherein the latent token representation technique comprises:

counting a number of successful mappings of the n-gram elements from the tokenized question to the n-gram elements of each document in the plurality of the tokenized documents and a corresponding tokenized candidate answer; and counting a number of skipped n-gram elements from the tokenized question to the n-gram elements of each document within the plurality of the tokenized documents and the corresponding tokenized candidate answer.

12. The computer system of claim 11, further comprising determining a return value based on a penalty value, wherein the penalty value is determined using the number of skipped n-gram tokens and the number of successful mappings.

13. The computer system of claim 12, wherein scoring the plurality of the candidate answers based on the latent token representation technique is determined from the return value.

14. The computer system of claim 13, wherein determining the precise answer comprises selecting the precise answer from the plurality of the candidate answers based on the return value associated with each candidate answer.

15. A computer program product for determining a precise answer to a question using a latent token representation technique, the computer program product comprising:

one or more computer-readable tangible storage medium and program instructions stored on at least one of the one or more tangible storage medium, the program instructions executable by a processor, the program instructions comprising:

program instructions to receive the question in a natural language;

program instruction to receive a plurality of candidate answers and a plurality of documents associated with the plurality of candidate answers in the natural language;

program instructions to tokenize the question, the plurality of the candidate answers, and the plurality of the documents into a corresponding n-gram sequence;

program instructions to map n-gram elements from the tokenized question to the n-gram elements of the plurality of the tokenized candidate answers and the plurality of the tokenized documents using the latent token representation technique;

program instructions to score the plurality of tokenized candidate answers based on the latent token representation technique; and program instructions to determine the precise answer based on the plurality of scored candidate answers.

16. The computer program product of claim 15, wherein program instructions to score the plurality of candidate answers is based on a simple Jaccard-style n-gram scorer, wherein the simple Jaccard-style n-gram scorer analyzes the mapped n-gram elements.

17. The computer program product of claim 15, wherein each document within the plurality of documents is selected from a group consisting of a text, a title, a passage, and a plurality of metadata.

18. The computer program product of claim 15, wherein the latent token representation technique comprises:
- program instructions to count a number of successful mappings of the n-gram elements from the tokenized question to the n-gram elements of each document in the plurality of the tokenized documents and a corresponding tokenized candidate answer; and
- program instructions to count a number of skipped n-gram elements from the tokenized question to the n-gram elements of each document within the plurality of the tokenized documents and the corresponding tokenized candidate answer.

19. The computer program product of claim 18, further comprising program instructions to determine a return value based on a penalty value, wherein the penalty value is determined using the number of skipped n-gram tokens and the number of successful mappings.

20. The computer program product of claim 19, wherein program instructions to score the plurality of the candidate answers based on the latent token representation technique is determined from the return value.

\* \* \* \* \*